(12) United States Patent
Pound et al.

(10) Patent No.: US 7,308,867 B1
(45) Date of Patent: Dec. 18, 2007

(54) MECHANISM FOR PREVENTION OF DIURNAL FEEDING FROM WILDLIFE TREATMENT AND FEEDING DEVICE

(75) Inventors: Joe Mathews Pound, Ingram, TX (US); John Allen Miller, Kerrville, TX (US); Gary Ray Earl, Kerrville, TX (US); Randy Wayne Ryan, Jr., Harper, TX (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 335 days.

(21) Appl. No.: 11/059,016

(22) Filed: Feb. 15, 2005

(51) Int. Cl.
*A01K 13/00* (2006.01)
*A01K 5/01* (2006.01)

(52) U.S. Cl. .................. 119/63; 119/61.3; 119/657
(58) Field of Classification Search .................. 119/63, 119/59, 61.1, 62, 61.3, 61.5, 61.53, 650, 652, 119/657, 667
See application file for complete search history.

(56) References Cited

U.S. PATENT DOCUMENTS

| | | | | | |
|---|---|---|---|---|---|
| 1,032,747 | A | * | 7/1912 | Evans | 119/522 |
| 2,972,979 | A | * | 2/1961 | Struck | 119/51.5 |
| 3,916,837 | A | * | 11/1975 | Murto | 119/476 |
| 4,488,510 | A | * | 12/1984 | Lundgren, Sr. | 119/60 |
| 4,771,735 | A | * | 9/1988 | Larsen | 119/62 |
| 4,793,290 | A | * | 12/1988 | O'Donnell | 119/62 |
| 5,367,983 | A | | 11/1994 | Pound et al. | |
| 5,649,499 | A | * | 7/1997 | Krietzman et al. | 119/52.1 |
| 5,806,237 | A | * | 9/1998 | Nelson et al. | 43/131 |
| 5,947,055 | A | * | 9/1999 | Cross | 119/58 |
| 7,156,052 | B2 | * | 1/2007 | Maupin et al. | 119/661 |
| 2006/0272587 | A1 | * | 12/2006 | Gordon | 119/61.1 |

* cited by examiner

*Primary Examiner*—Yvonne R. Abbott
(74) *Attorney, Agent, or Firm*—John Fado; Randall E. Deck; Lesley Shaw

(57) ABSTRACT

Deer and other nocturnal animals may be allowed to feed from a feeding device which also restricts feeding by squirrels, birds, and other diurnal feeders. The apparatus includes a walled enclosure having a sloped bottom for facilitating the gravity flow of animal feed toward an outlet from which the feed can then be accessed by the target animals. The opening is provided with a sliding cover which is controllably movable between a first position aligned over the opening to prevent dispensing of feed, and a second position removed from the opening to allow dispensing of feed. To prevent blockage of the cover by the feed when the cover is moved from the open to the closed position, an internal member is disposed within the enclosure which creates an accumulation chamber or dead space into which feed can be readily moved out of the path of the moving cover. In use, the cover can be moved to the first, closed position during daylight hours to prevent or limit feeding by diurnal feeding animals, and to the second, open position during night hours to allow feed to be dispensed to nocturnal feeding animals.

19 Claims, 6 Drawing Sheets

MECHANISM FOR PREVENTION OF DIURNAL FEEDING FROM WILDLIFE TREATMENT AND FEEDING DEVICE

BACKGROUND OF THE INVENTION

1. Field of the Invention

The invention is drawn to an apparatus and method for controlling feeding by animals, particularly preventing daytime feeding animals from feeding from a device intended for treating and feeding animals such as deer that will also feed at night.

2. Description of the Prior Art

Many diseases are transmissible to man and animals by ectoparasites such as ticks. Because some wildlife species, such as white tailed deer, are capable of propagating and harboring large populations of these ectoparasites, an effective strategy for the prevention of disease transmission should include treatment of animals, including wildlife, for the control of ectoparasites. Yet, the treatment of significant numbers of animals, especially wildlife that are not easily captured or otherwise able to be handled and treated directly, for control of these ectoparasites remains a difficult problem.

In areas where an effort is being made to eradicate ticks, the inability to control ticks on wildlife can be a critical factor to the success of the program. For example, disease carrying cattle ticks were eradicated from the United States in the 1940's, and a quarantine zone was established along the Texas Mexico border between Del Rio and Brownsville, Tex., to prevent reinfestation of U.S. cattle herds. Yearly outbreaks of ticks that occur in the quarantine zone are controlled by dipping of cattle and by vacating infested pastures. However, increased populations of white tailed deer, elk, exotic deer, antelope and other marginal host animals in the region is complicating the eradication effort, and in some areas has prevented eradication or reinfested premises with the ticks. For other ectoparasites such as deer ticks, which are the vectors of Lyme disease, wildlife, and white tailed deer in particular, are the primary hosts for adult tick. The ability to control these ticks on deer would therefore be a valuable tool in the management of Lyme disease.

Pound et al. (U.S. Pat. No. 5,367,983) previously described an apparatus and method for feeding and applying a pesticide to animals, particularly antlered animals such as deer. That apparatus, commonly referred to as the "4-poster" includes an open top receptacle having a bottom and side walls, and a feed supply bin positioned within the receptacle having an opening at its lower end communicating with the bottom of the receptacle. Animal feed, typically corn, within the bin is dispensed to the bottom of the receptacle through the opening to a feeding area which is bound by the lower end of the bin and the bottom and side walls of the receptacle. At least one pair of spaced apart vertical support members are positioned adjacent the side walls of the receptacle, approximately opposite or across from the opening of the feed supply bin, and extend upwardly from the receptacle above the upper edge of the side walls. For application of pesticide upon the feeding animals, a pesticide applicator is positioned on each support member, which is adapted or constructed to apply pesticide onto the animal upon contact therewith (i.e., rubbing). The support members are spaced sufficiently close together to prevent an animal from passing its head therebetween and accessing the feeding area. To feed, the animal must therefore access the device from the side and pass its head between one pesticide applicator and an outwardly extending horizontal surface that extends partly over the opening to the feeding area. Being positioned at least partially over the feeding area, the outwardly extending surface effectively forces the animal to turn its head sideways in order to access the feeding area, and hence contact the applicator on the side of its head and neck and on its ears.

The "4-poster" device of Pound et al. has been successfully used in a variety of environments and regions throughout the United States for controlling ticks on deer. However, the device does not prevent squirrels, birds, and other diurnal feeders from consuming the feed. Thus, there remains a need for an improved device for treating nocturnal feeding animals, including deer.

SUMMARY OF THE INVENTION

We have now invented a novel apparatus and method for feeding animals while controlling access to the animal feed. The invention is particularly effective for feeding deer and other nocturnal feeding animals, while restricting feeding by squirrels, birds, and other diurnal feeders. The apparatus includes a walled enclosure having a sloped bottom for facilitating the gravity flow of animal feed toward an outlet from which the feed can then be accessed by the target animals. The opening is provided with a sliding cover which is controllably movable between a first position aligned over the opening to prevent dispensing of feed, and a second position removed from the opening to allow dispensing of feed. To prevent blockage of the cover by the feed when the cover is moved from the open to the closed position, an internal member is disposed within the enclosure which creates an accumulation chamber or dead space into which feed can be readily moved out of the path of the moving cover. In use, the cover can be moved to the first, closed position during daylight hours to prevent or limit feeding by diurnal feeding animals (the diurnal feeders will only be able to access any feed which has already been dispensed, no fresh feed will be dispensed), and to the second, open position during night hours to allow feed to be dispensed to nocturnal feeding animals.

In accordance with this discovery, it is an object of this invention to provide an improved animal feeding apparatus which allows nocturnal feeding animals such as deer to access feed, while preventing or limiting access to the feed by diurnal feeding animals such as squirrels and birds.

Another object of this invention is to provide an animal feeding apparatus having an openable and closable opening for feed which is not subject to blockage.

Yet another object of this invention is to provide an animal feeding apparatus which can be automatically controlled to allow nocturnal feeding animals to access feed but prevent access to the feed by diurnal feeding animals.

Still another object of this invention is to provide an improved apparatus for simultaneously feeding and applying pesticide to the head and/or neck of nocturnal feeding animals, while preventing or limiting feeding therefrom by diurnal feeding animals.

Other objects and advantages of the invention will become readily apparent from the ensuing description.

Figure 1:
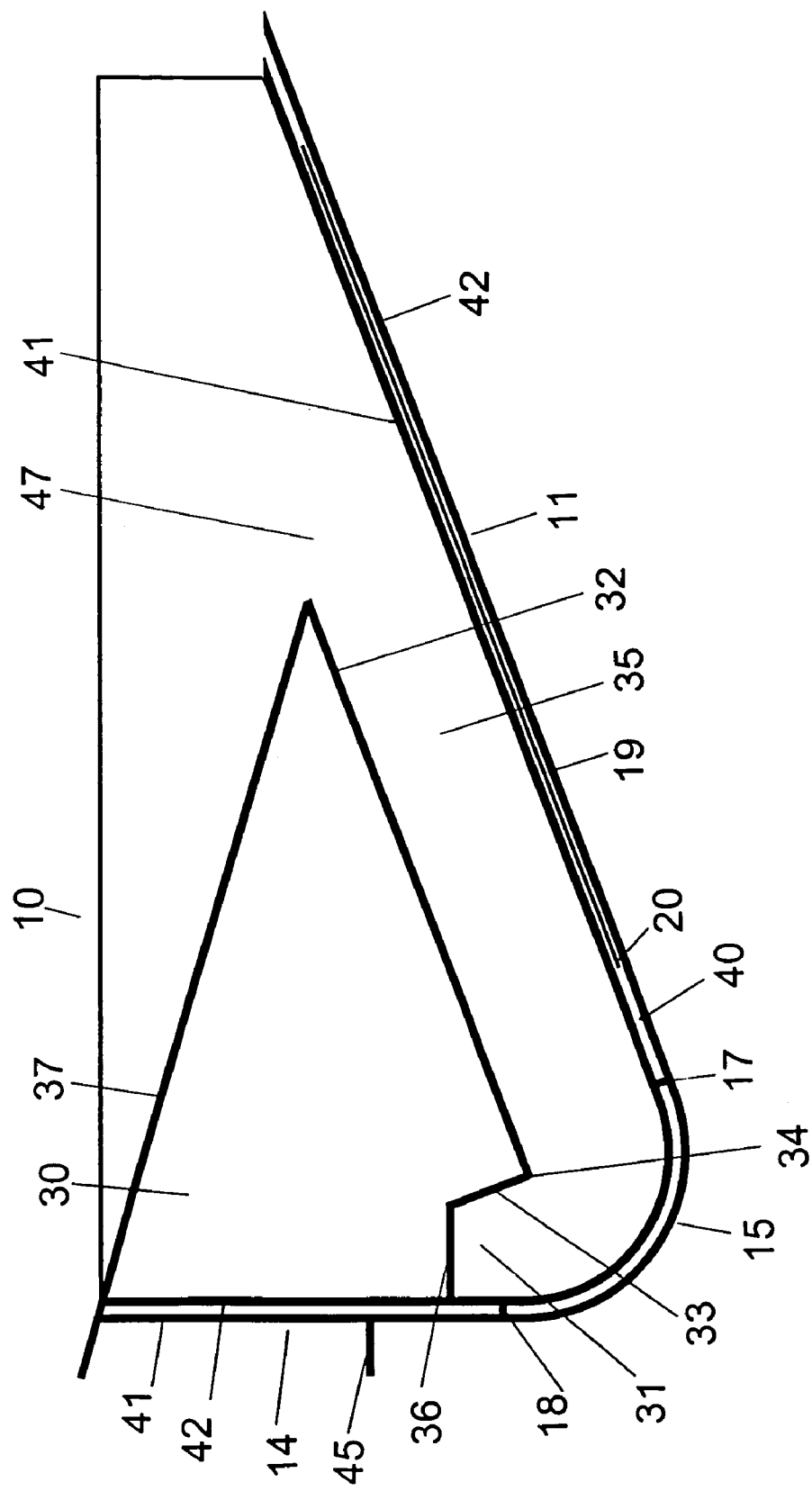
FIG. 1 is a cross-sectional side view of the apparatus of the invention.
Figure 2:
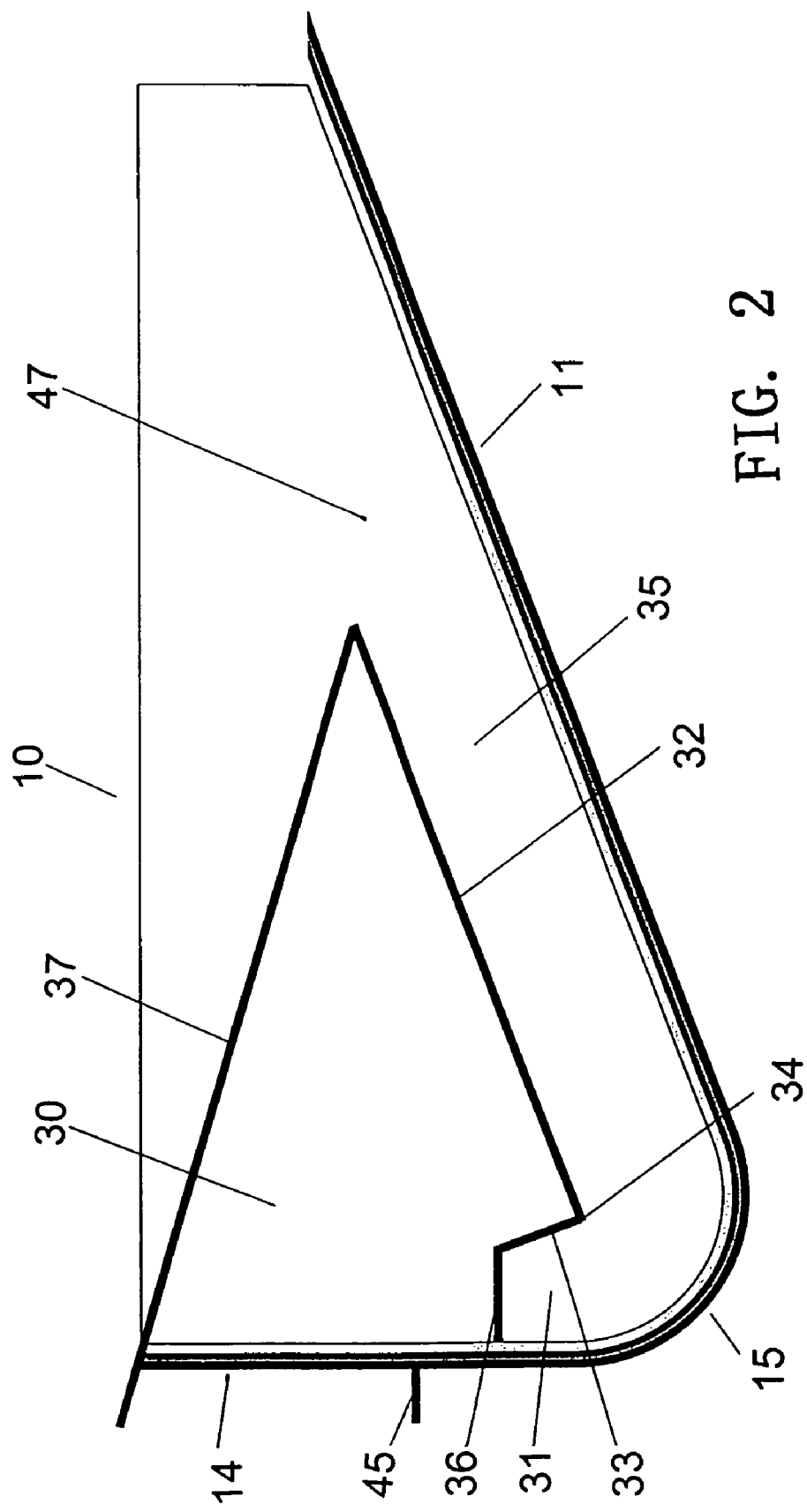
FIG. 2 is a side view of the apparatus of FIG. 1.

REFERENCE CHARACTERS 10 enclosure
11 inclined bottom surface
12 first side wall
13 second side wall
14 front wall
15 curved wall
16 opening
17 lower edge of opening
18 upper edge of opening
19 sliding cover
20 front edge of cover
30 internal member
31 accumulation chamber
32 first, inclined baffle
33 second, upwardly extending baffle
34 lower edge
35 passageway
36 first flange
37 third, inclined baffle
40 channel
41 upper sheet
42 lower sheet
43 slot
44 junction
45 second flange
46 second accumulation chamber
47 open end
110 "4-poster"
114 feeding area
120 feed supply bin
121 feed bin opening
122 feed gate
125 feed bin baffle

DETAILED DESCRIPTION OF THE INVENTION

The apparatus and method of this invention is effective for controlling access of animals to feed. The apparatus can be used as a feeder to selectively prevent or allow any animal to access an animal feed contained therein. The particular conditions which will govern the decision to allow access to the feed may be selected in accordance with the needs of the user. However, without being limited thereto, the invention is preferably used for allowing nocturnal feeding animals such as deer to access feed, while preventing feeding by diurnal feeding animals such as squirrels and birds. Alternatively, the invention may be used for feeding diurnal animals while preventing feeding by nocturnal animals, or to control feeding for different time periods than a night/day cycle, such as allowing feeding only at specified times, days, or weeks. Although the device may be used for feeding a wide variety of animals, including domestic animals, it is particularly valuable for feeding wild or captive animals, especially those species which may have antlers or horns. Without being limited thereto, animals which may be fed include deer, such as white tailed deer and red deer, raccoons, antelope such as blackbuck antelope, and elk.

Without being limited thereto, the apparatus and method are particularly adapted for use in conjunction with the aforementioned "4-poster" device for feeding and applying pesticide onto animals disclosed by Pound et al. in U.S. Pat. No. 5,367,983, the contents of which are incorporated by reference herein. In this embodiment, the apparatus can be manufactured and distributed independently of the "4-poster" device for use as a retro-fit, or it may be manufactured and distributed in conjunction with the "4-poster" device.

While the "4-poster" device of Pound et al. has worked remarkably well for the control of ticks on deer, problems have been encountered in areas with heavy squirrel populations. Squirrels, which are diurnal feeders, quickly find and consume some of the feed in the feeding chambers of the "4-poster." In the case of corn-based feeds, which are most typically used in the field, the squirrels will eat the germ from the corn and leave the remainder of the kernels in the feeding area. These remaining partially eaten kernels and "fines" accumulate in the feeding area where they are subject to mold growth and caking. This moldy, caked corn is less attractive to the deer and discourages them from feeding, and may even block or limit access to the feed, thereby reducing the efficacy of the pesticide treatment onto the deer for tick control. Moreover, in some areas, birds have also posed a problem by feeding from the apparatus during the daytime. The consumption and adulteration of corn by these diurnal feeders is also undesirable and costly. Thus, despite the advances in the control of ticks on deer and other animals which have occurred as a result of the introduction of the "4-poster" device, there is a need to prevent the feeding of squirrels and other diurnal feeding animals.

Referring to the Figures, the apparatus of the invention includes an enclosure (10) having an inclined bottom surface (11), first and second opposed, upwardly extending walls (12 and 13, respectively), an upwardly extending front wall (14), and a curved wall section (15) between and joining the inclined bottom surface and the front wall. The side walls (12 and 13) may be substantially vertical, but are preferably sloped inwardly toward the bottom wall (11). The front wall (14) is preferably substantially vertically disposed, while the inclined bottom surface (11) is substantially flat and is sloped downwardly (declining) toward the front wall (14) to facilitate the gravity flow of animal feed disposed thereon toward the curved wall section (15). One or more openings or outlets (16) are provided through the curved wall section (15) to allow feed flowing down the inclined bottom surface (11) to be dispensed to a feeding animal. The lower edge (17) of the opening (16) is proximal to the bottom surface (11), while the upper edge (18) of the opening may be proximal to the front wall (14) or it may even extend into the front wall. To control dispensing of the feed from the enclosure, a sliding cover (19) is included which is movable between a first, closed position wherein it is aligned with and disposed over the opening (16), and a second, open position wherein it is removed away from the opening (16) to allow dispensing of feed therethrough.

On occasion, particularly when using particulate feed such as corn, feed may become trapped between the upper edge (18) of the opening (16) and the front edge (20) of the cover (19) as the cover is moved upwardly into the first, closed position, thereby jamming of the cover and preventing complete closure of the opening. To prevent this blockage by feed, an internal member (30) is disposed within the enclosure which creates an accumulation chamber or dead space (31) into which the cover can push the feed as it moves to close the opening (i.e., moving the feed out of the path of the cover). The internal member (30) also functions to prevent the feed from reaching a depth which is greater than the height of the opening (16) as it flows down the inclined bottom surface (11). This internal member (30) is disposed above the bottom surface (11) and extends substantially between said side walls (12 and 13), and includes a first, inclined baffle (32) which slopes downwardly in a direction toward the front wall (14), and a second, upwardly extending baffle (33), which two baffles are joined together at their lower ends (34). The first baffle (32) is disposed above the inclined bottom surface (11) to define a conduit or passageway (35) therebetween effective for the flow of the feed, while the second baffle (33), which may be substantially vertical, is spaced from the front wall (14) to form the feed accumulation chamber (31) therebetween. A first flange or projection (36) is also provided which is disposed above the opening (16) and spaced from the upper edge (18) thereof, and which extends inwardly from the front wall (14) to the second baffle (33) and between the side walls (12) and (13) to form an upper limit or top to the feed accumulation chamber (31). Thus, the accumulation chamber (31) is defined by the front wall (14), first flange (36), second baffle (33) and side walls (12) and (13), and is open at its bottom to communicate directly with the area behind the opening (16). The disposition of the first flange (36) is not critical and may vary. In a first embodiment shown in FIG. 1, the flange (36) is shown as a separate component which is approximately horizontal. Alternatively, the flange (36) may be integral with either the front wall (14) or the second baffle (33), and it may be angled or curved.

The spacing of the second baffle (33) from the front wall (14) and the first flange (36) from the upper edge (18) of opening are not critical, but should be selected such that the accumulation chamber (31) is sufficiently large to accommodate particles of feed which may be pushed out of the way of the advancing cover (19). Thus, these spacings should typically be greater than the maximum dimension of the particles of feed being used to prevent wedging of a particle into the upper extremity of the accumulation chamber. Without being limited thereto, in the preferred embodiment using corn as the feed, the horizontal distance that the first flange (36) extends from the front wall (14) to the second baffle (33) is between about 0.5 in. to about 0.75 in. In general, the spacing of the first baffle (32) from the bottom surface (11) is preferably selected that the lower end (34) of the first baffle (32) is vertically disposed approximately at or below the upper edge (18) of opening (16). If this lower end (34) was substantially over the height of the upper edge (18), feed flowing normally down the passageway (35) could be deposited at a height which would be over the upper edge (18), and the weight of the feed could impede the ability of the cover (19) to push any feed in its path into the accumulation chamber (31). Otherwise, the spacing of the first baffle (32) from the bottom surface (11) is not critical, and need only be sufficiently large that the flow of feed through passageway (35) is not restricted.

Figure 5:
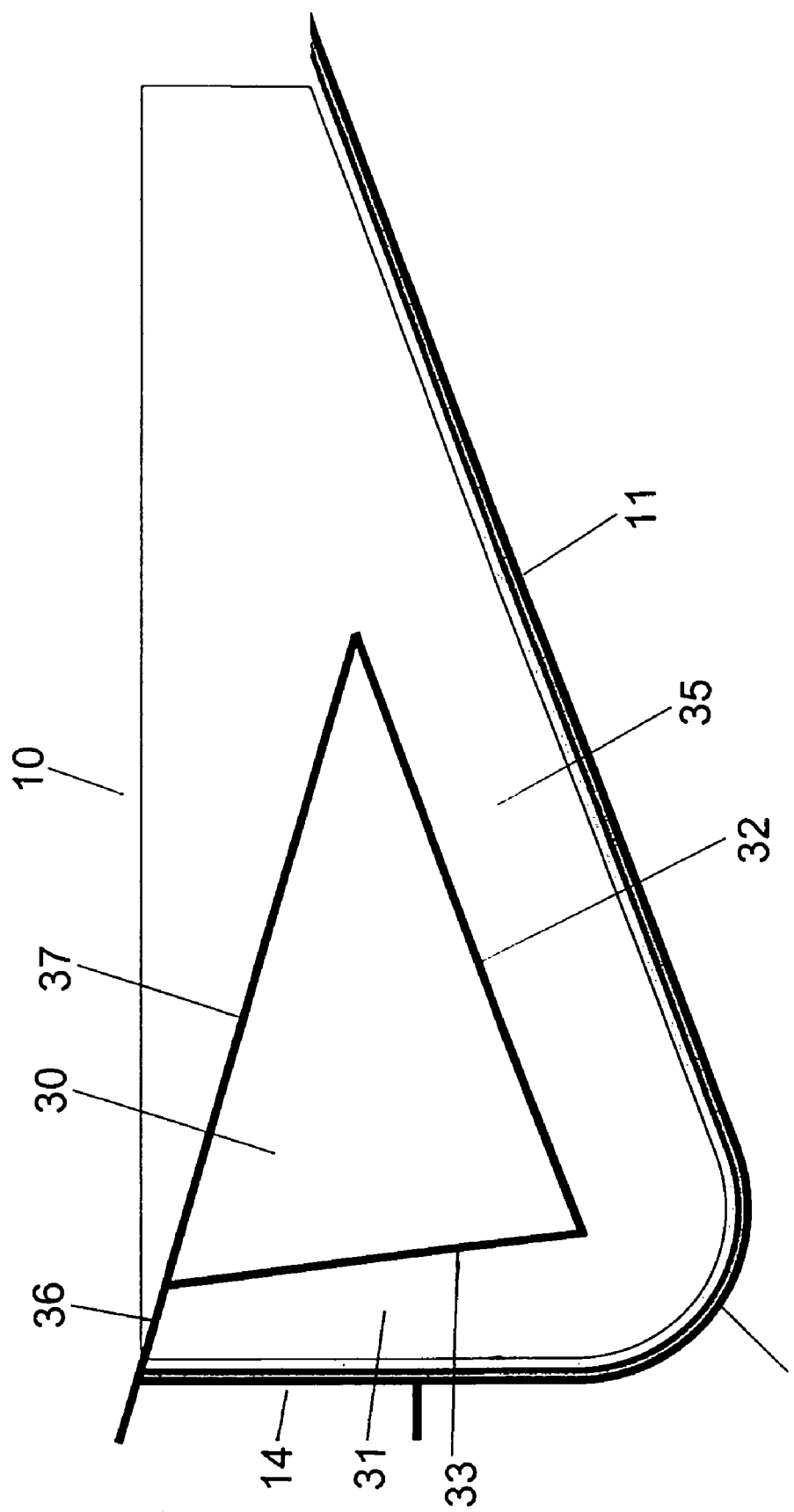
FIG. 5 is a side view of an alternative embodiment apparatus of the invention.

To facilitate the flow of feed into the passageway (35) and prevent feed from resting on the top of the internal member (30), internal member (30) preferably further includes an optional third, inclined baffle (37) extending from the upper end of the first, inclined baffle (32) with an upward slope in the direction toward the front wall (14). The lower end of this third baffle (37) is adjacent, and preferably joined, to the first baffle (32) at the end thereof distal from front wall (14). As with the first and second baffles (32) and (33), this third baffle (37) also extends substantially between the side walls (12) and (13). Third baffle (37) should have a slope effective to promote downward movement of feed under gravity and thereby prevent feed from resting thereon. In an alternative embodiment shown in FIG. 5, third baffle (37) may be integral with first flange (36).

Cover (19) may be slidably disposed adjacent to the interior or exterior surface of the enclosure (10), although it is preferably disposed within a channel (40). In this preferred embodiment, most clearly shown in FIG. 1, each of the inclined bottom surface (11), front wall (14), and curved wall section (15) are formed from a pair of parallel, spaced apart sheets or plates (41) and (42) having an interstitial space therebetween. This interstitial space provides the channel (40) which extends, continuous and uninterrupted, from the bottom surface (11) through the curved wall section (15) and at least a portion of the front wall (14). Cover (19) is slidably disposed within this channel (40) from the first, closed position to the second, open position. By way of illustration and not being limited thereto, in this first position at least a portion of the cover (19) is situated within the interstitial space in the curved section (15) and through opening (16), and extends to or above the upper edge (18) of the opening. In contrast, at the second position the cover (19) is moved downwardly, away from the opening (16) and into the interstitial space in the lower portion of the curved wall section (15) and/or the inclined bottom surface (11). In an optional, yet particularly preferred variation of this embodiment, the vertical level or height of the upper edge (18) of opening (16) through sheet (41) is offset from the vertical level of the upper edge of the opening through sheet (42). Although the upper edge through sheets (41) and (42) may be disposed substantially evenly (i.e., at substantially the same vertical level), by offsetting the upper edge, the potential for any particle of feed to block the movement of the cover (19) to the first, closed position, is further minimized. With edge (18) through sheet (41) being offset from the edge (18) through sheet (42), any particles of feed encountered by the front edge (20) of the cover (19) at or near the top of opening (16) will tend to be pushed in the direction toward that sheet (41) or (42) which has the higher edge (18).

Figure 3:
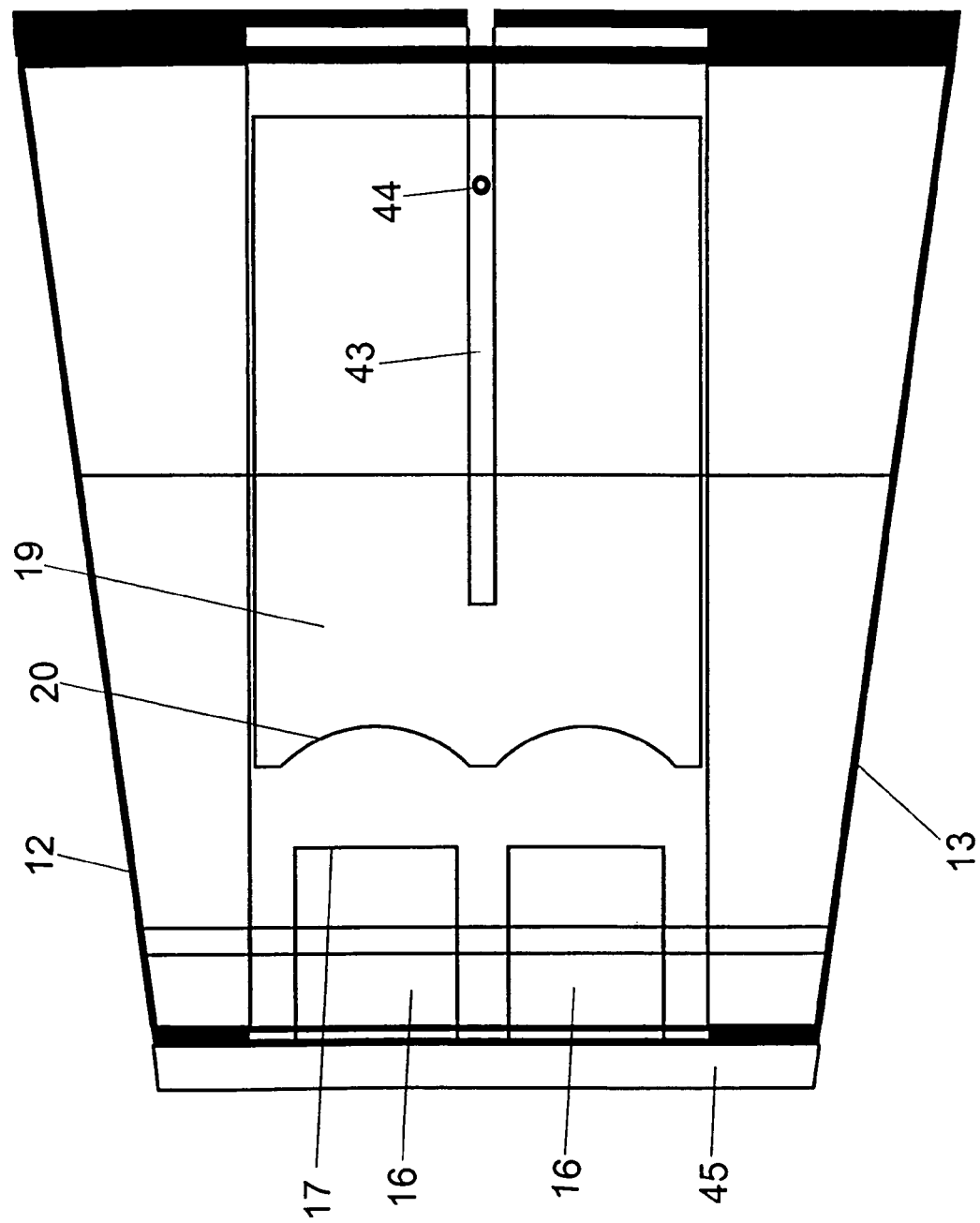
FIG. 3 is a top view of the apparatus of FIG. 1.
Figure 4:
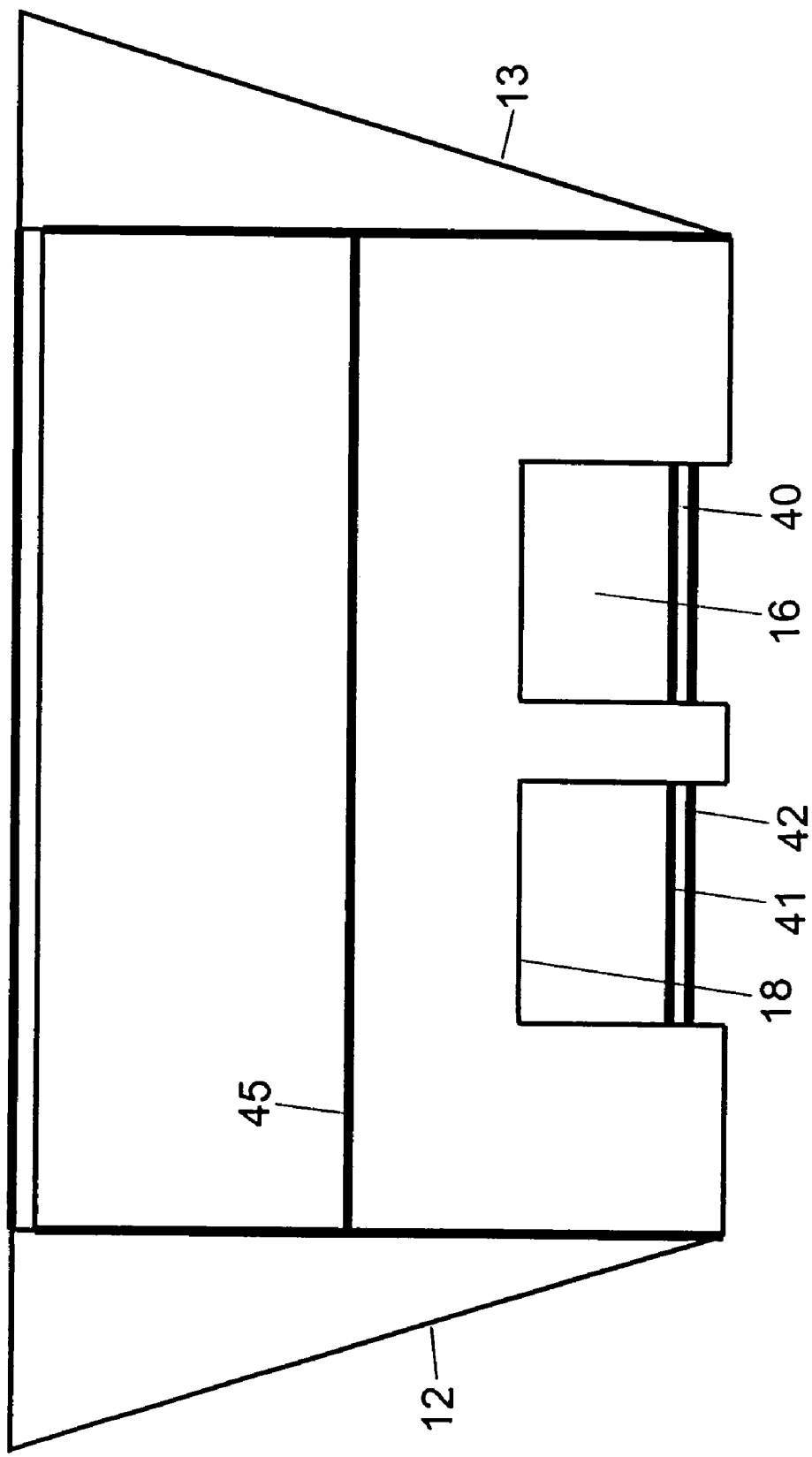
FIG. 4 is an end view of the apparatus of FIG. 1.

Movement of the cover (19) between the first, closed position and second, open position, may be effected manually, but is preferably automatically effected using a motor. A variety of motors are effective for moving the cover between the first and second position suitable for use herein, although conventional battery or solar powered motors are typically preferred. The motor may be operably linked to the cover (19) through a variety of conventional connectors, which may include but are not limited to cables or lines, springs, belts, chains, cooperating gears, ball screws, pneumatic cylinders, or hydraulic cylinders. As shown in FIG. 3, a slot or groove (43) may be provided through the lower sheet (42) of the bottom surface (11) to allow linkage to the cover (19) such as at junction (44). Independent actuation of the motor may be provided by use of conventional automatic controllers. A variety of controllers are suitable for use herein and may be selected by the user in accordance with the intended use of the feeder. However, in the preferred embodiment for allowing feeding by nocturnal animals while preventing feeding by diurnal feeding animals, examples of suitable controllers include but are not limited to simple timers, microprocessor controllers, daylight sensors, and infrared detectors, with infrared detectors being preferred. Infrared detectors are not susceptible to variability as a result of overcast skies, and thus are particularly effective for allowing feeding during nighttime hours by nocturnal feeding animals but restricting feeding during daylight hours by diurnal feeding animals regardless of weather conditions.

Figure 6:
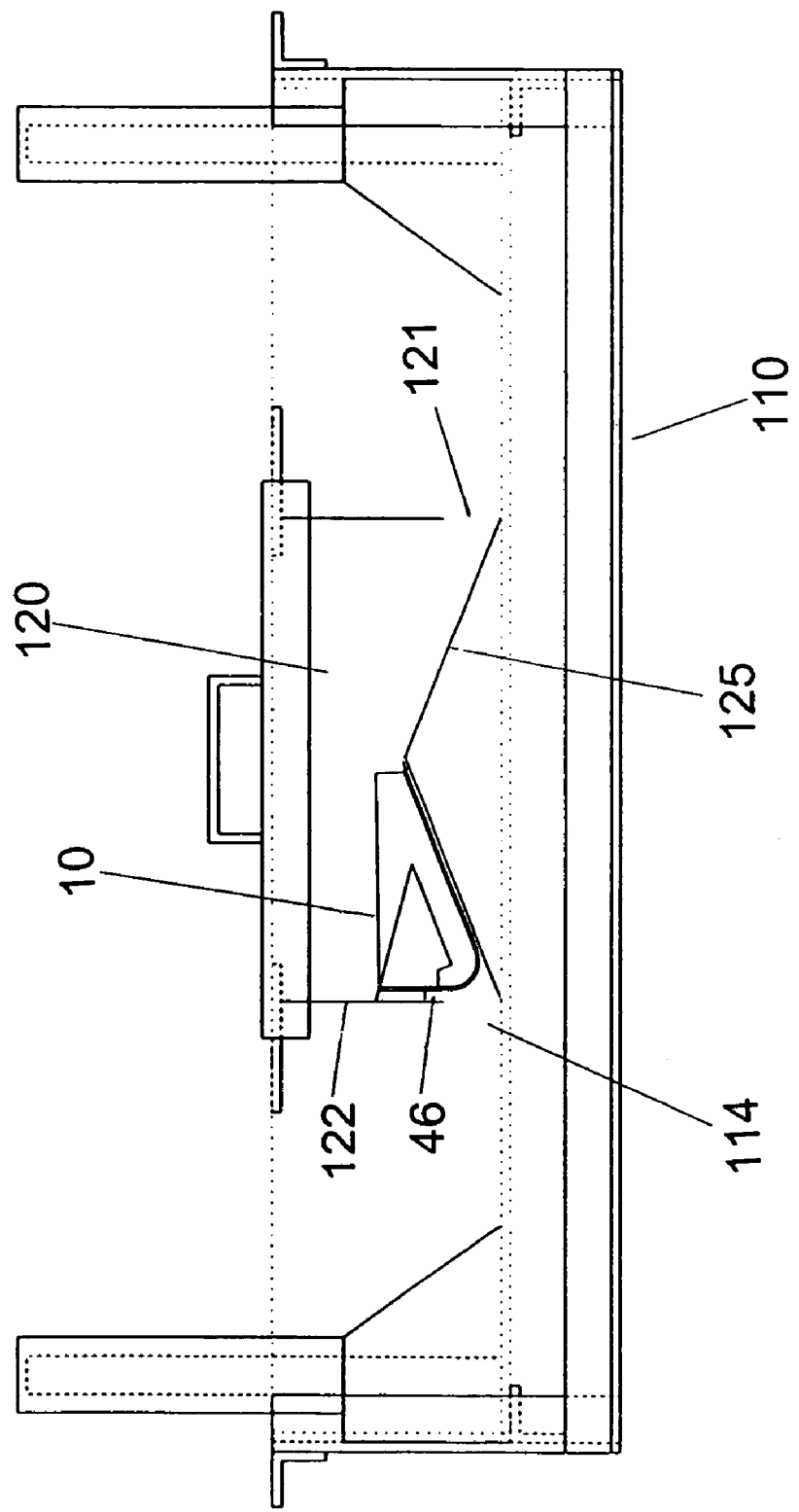
FIG. 6 is a cross-sectional side view of the apparatus of FIG. 1, shown a preferred embodiment wherein it is disposed within the apparatus of U.S. Pat. No. 5,367,983.

In another preferred embodiment, the apparatus also includes an optional, second flange (45) disposed above opening (16) and spaced from the upper edge (18) thereof, and which extends outwardly away from the front wall (14). This second flange, which is typically approximately horizontally disposed and extends substantially between the side walls (12) and (13) (i.e., across the width of the front wall), is preferably provided when the enclosure (10) is to be used in conjunction with the above-mentioned "4-poster" device of Pound et al. In this embodiment, which is shown in FIG. 6, the second flange (45) is adapted to contact the feed gate (122), spacing the front wall (14) therefrom a distance effective to form a second accumulation chamber or dead space (46) on the opposite side (the outside) of the enclosure from the above-mentioned accumulation chamber (31). This second accumulation chamber (46) functions in the same fashion as accumulation chamber (31) by providing another space into which the cover (19) can push the feed out of its path as it moves to close opening (16). As such, the second flange should be sufficiently large that accumulation chamber (46) can accommodate the particles of feed which are used in the same manner as described for the accumulation chamber (31). Thus, without being limited thereto, the horizontal distance that the second flange (45) extends from the front wall (14) to the feed gate (122) (i.e. the width of the second accumulation chamber (46) at its top) is between about 0.5 in. to about 0.75 in.

The material of construction of the apparatus is not critical and the components can be manufactured from a variety of materials such as plastics and metals, although plastics are preferred. In a particularly preferred embodiment, at least the inclined bottom surface (11), curved wall section (15), and front wall (14) (or the sheets thereof) are molded as single, continuous surfaces. The cover (19) may also be constructed from a similar variety of materials, although in the preferred embodiments shown in the figures, the cover must obviously be capable of flexing as it moved between the first and second positions. The skilled practitioner will recognize that this flexibility may be effected by constructing the material from a flexible material, or alternatively from an otherwise inflexible material having a plurality of parallel cuts provided on its interior surface (i.e., facing the interior of the enclosure and the direction of the cuts being normal to the direction of movement of the cover). In a preferred embodiment, the cover (19) covered or coated polytetrafluoroethylene, or formed from thin sheets of polytetrafluoroethylene. In a particularly preferred embodiment shown in FIG. 3, at least the portion of the front edge (20) of the cover (19) which passes through the opening (16) is concave. Constructing the cover (19) in this manner minimizes "catching" of the edge (20) of the cover on the upper edge (18) of the opening, particularly when the cover is disposed within channel (40).

In use, the enclosure is provided in the locus or vicinity of the target animal(s) to be fed. Animal feed is delivered to the enclosure (10) through open end (47) where it flows down passageway (35) and inclined bottom surface (11) under the force of gravity toward front wall (14) and opening (16). If access to the feed is desired, such as at sunset to allow nighttime feeding by nocturnal animals, the cover (19) is moved to the second position to allow feed to flow out through the openings. In contrast, if access to the feed is to be denied, such as at dawn to prevent feeding during daylight hours by diurnal animals, the cover (19) is moved to the first position thereby blocking the opening (16) and preventing additional feed from being dispensed. The apparatus can be used to deliver a variety of solid animal feeds, but is preferably used with corn and pelletized feeds.

As mentioned above, in a particularly preferred embodiment the enclosure 10 is used in conjunction with the "4-poster" device of Pound et al. to control animal access to feed therein, and specifically to restrict feeding therefrom by diurnal feeding animals such as squirrels, birds, mice, and other rodentia. An example of the use of the enclosure (10) in the "4-poster" is shown in FIG. 6. In this embodiment, the enclosure (10) is disposed within the "4-poster" (110) with its bottom surface (11) resting on the feed bin baffle (125), and with second flange (45) in contact with the feed gate (122). As feed is loaded into the feed supply bin (120) it flows into the open end (47) of the enclosure, down passageway (35), to opening (16). Any feed which falls onto the sloping third baffle (37) will also flow toward the open end. If cover (19) is in the second, open position, the feed will flow through the opening (16), feed bin opening (121), and into feeding area (114), where it may be consumed by the target animals. When feeding is to be prevented, cover (19) is moved to the first, closed position, to prevent any additional feed from being dispensed. As the cover moves across the opening (16) and across upper edge (18), feed which is contacted by the front edge (20) of the cover may be pushed out of the path of the cover into the accumulation chamber (31) and/or accumulation chamber (46).

It is understood that the foregoing detailed description is given merely by way of illustration and that modifications and variations may be made therein without departing from the spirit and scope of the invention.

We claim:

1. An apparatus for controlling access to animal feed comprising:
   a. an enclosure for dispensing animal feed therefrom, said enclosure comprising an inclined bottom surface, opposed first and second upwardly extending side walls, and an upwardly extending front wall, wherein said inclined bottom surface has a downward slope in a direction toward said front wall and is joined to said front wall through a curved wall section,
   b. at least one opening through said curved wall section effective for allowing dispensing of feed from said enclosure, said opening having an upper edge proximal to or extending into said front wall, and a lower edge proximal to said bottom wall,
   c. a sliding cover effective for closing said opening, said cover being movable between a first position aligned over said opening to prevent dispensing of feed from said enclosure, and a second position removed from said opening to allow dispensing of feed from said enclosure,
   d. an internal member disposed within said enclosure above said bottom surface and extending substantially between said side walls, said internal member comprising a first, inclined baffle having a downward slope in a direction toward said front wall, and a second, upwardly extending baffle, said first baffle and said second baffle being connected at their lower ends, wherein said first baffle is disposed above said inclined bottom surface to define a passageway therebetween for the flow of said feed, and said second baffle is spaced from said front wall to define a feed accumulation chamber therebetween, and
   e. a first flange extending inwardly from said front wall to said second baffle and extending between said side walls to form an upper limit to said feed accumulation chamber, said first flange being disposed above said opening and spaced from said upper edge thereof.

2. The apparatus of claim 1 wherein said lower end of said first baffle is disposed below said upper edge of said opening.

3. The apparatus of claim 1 further comprising a second flange extending outwardly away from said front wall, said second flange being disposed above said opening and spaced from the upper edges thereof.

4. The apparatus of claim 3 wherein the horizontal distance that said second flange extends from said front wall is between about 0.5 in. to about 0.75 in.

5. The apparatus of claim 3 wherein said second flange extends substantially between said side walls.

6. The apparatus of claim 1 wherein the horizontal distance that said first flange extends from said front wall to said second baffle is between about 0.5 in. to about 0.75 in.

7. The apparatus of claim 1 wherein each of said inclined bottom surface, front wall, and curved wall section comprise a pair of parallel, spaced apart sheets forming a interstitial space, said interstitial space providing a continuous and uninterrupted channel from said bottom surface to said curved wall section and said front wall wherein said sliding cover is disposed, said sliding cover being slidable within said channel from said first position to said second position.

8. The apparatus of claim 7 wherein at said first position at least a portion of said cover is situated within said interstitial space in said curved section and through said opening, and at said second position said cover is moved away from said opening.

9. The apparatus of claim 7 wherein at said first position said cover extends above said upper edge of said opening.

10. The apparatus of claim 9 wherein said cover comprises a front edge proximal to said front wall and at least the portion of said front edge passing through said opening is concave.

11. The apparatus of claim 1 wherein said downward slope of said bottom wall is effective to allow gravity flow of feed thereon toward said opening.

12. The apparatus of claim 1 wherein said first baffle member comprises a upper end distal from said front wall, and said internal member further comprises a third, inclined baffle having a lower end adjacent to said upper end of said first baffle, which said third baffle member is inclined with an upward slope in a direction toward said front wall and extends substantially between said side walls.

13. The apparatus of claim 12 wherein said slope of said third baffle is effective to prevent feed from resting thereon.

14. The apparatus of claim 1 further comprising a motor effective for moving said cover between said first and second position.

15. The apparatus of claim 14 further comprising an automatic controller effective for actuating said motor.

16. The apparatus of claim 15 wherein said automatic controller comprises an infrared detector effective for allowing feeding during nighttime hours by nocturnal feeding animals but restricting feeding during daylight hours by diurnal feeding animals.

17. In an apparatus for feeding and applying pesticide to animal comprising:
(a) an open top receptacle having a bottom and side walls;
(b) a feed supply bin positioned within said receptacle, said bin having an opening at the lower end thereof communicating with said bottom of said receptacle for dispensing feed from said bin to said bottom of said receptacle, said lower end together with said side walls and said bottom of said receptacle defining a feeding area;
(c) at least one pair of spaced apart vertical support members adjacent said side walls and extending upwardly from said receptacle above the upper edge of said side walls, said support members being positioned approximately opposite said opening of said bin, and are spaced sufficiently close together to prevent an animal from passing its head therethrough to access feed in said feeding area but allow an animal to access feed in the feeding area from the sides of said support members; and
(d) a pesticide applicator positioned on each of said support members and adapted to apply pesticide onto a subject animal upon contact therewith;

wherein the improvement comprises providing the apparatus of claim 1 within said receptacle adjacent to said feeding area such that said passageway is in communication with said lower end of said feed supply bin and said opening is in communication with said feeding area, such that feed in said feed supply bin flows from said bin through said passageway and said opening and is dispensed in said feeding area when said sliding cover is in said second opening.

18. A method for feeding nocturnal feeding animals but restricting or preventing feeding by diurnal feeding animals comprising:

A. providing an apparatus comprising:
a. an enclosure for dispensing animal feed therefrom, said enclosure comprising an inclined bottom surface, opposed first and second upwardly extending side walls, and an upwardly extending front wall, wherein said inclined bottom surface having a downward slope in a direction toward said front wall and is joined to said front wall through a curved wall section,
b. at least one opening through said curved wall section effective for allowing dispensing of feed from said enclosure, said opening having an upper edge proximal to or extending into said front wall, and a lower edge proximal to said bottom wall,
c. a sliding cover effective for closing said opening, said cover being movable between a first position aligned over said opening to prevent dispensing of feed from said enclosure, and a second position removed from said opening to allow dispensing of feed from said enclosure,
d. an internal member disposed within said enclosure above said bottom surface and extending substantially between said side walls, said internal member comprising a first, inclined baffle having a downward slope in a direction toward said front wall, and a second, upwardly extending baffle, said first baffle and said second baffle being connected at their lower ends, wherein said first baffle is disposed above said inclined bottom surface to define a passageway therebetween for the flow of said feed, and said second baffle is spaced from said front wall to define a feed accumulation chamber therebetween, and
e. a first approximately horizontally disposed flange extending inwardly from said front wall to said second baffle and extending between said side walls to form an upper limit to said feed accumulation chamber, said first flange being disposed above said opening and spaced from the upper edges thereof, B. delivering an animal feed into said passageway in said enclosure whereby said feed may flow toward said opening, C. moving said cover to said first position at approximately sunrise to prevent feed from being dispensed from said enclosure, and D. moving said cover to said second position at approximately sunset to allow feed to be dispensed from said enclosure.

19. The method of claim 18 wherein said moving said cover to said first position and said moving said cover to said second position are automatically controlled.

* * * * *